United States Patent [19]

Anderson et al.

[11] Patent Number: 4,968,216
[45] Date of Patent: Nov. 6, 1990

[54] TWO-STAGE FLUID DRIVEN TURBINE

[75] Inventors: John R. Anderson, Kirkland; Sidney W. Welling, Bellevue, both of Wash.

[73] Assignee: The Boeing Company, Seattle, Wash.

[21] Appl. No.: 659,995

[22] Filed: Oct. 12, 1984

[51] Int. Cl.$^5$ .............................................. F01D 1/02
[52] U.S. Cl. ........................... 415/199.5; 416/223 A; 416/DIG. 2; 415/181
[58] Field of Search ............... 416/223 A, DIG. 2; 415/181, 199.5

[56] References Cited

U.S. PATENT DOCUMENTS

| | | | |
|---|---|---|---|
| 2,258,793 | 10/1941 | New | 415/181 |
| 2,378,372 | 6/1945 | Whittle | 416/223 A |
| 2,426,270 | 8/1947 | Howell . | |
| 2,435,042 | 1/1948 | Johansson . | |
| 2,715,011 | 8/1955 | Schörner | 416/223 A |
| 2,935,246 | 5/1960 | Roy | 415/181 |
| 2,974,927 | 3/1961 | Johnson | 415/181 |
| 3,333,817 | 8/1967 | Rhomberg | 415/181 |
| 3,347,520 | 10/1967 | Owczarek | 416/223 A |
| 3,442,441 | 5/1969 | Dettmering | 415/181 |
| 3,475,108 | 10/1969 | Zickuhr | 416/DIG. 2 |
| 3,877,835 | 4/1975 | Siptrott . | |
| 3,953,148 | 4/1976 | Seippel et al. | 415/181 |
| 3,963,369 | 6/1976 | Balje | 415/181 |
| 3,964,837 | 6/1976 | Exley | 415/181 |
| 4,011,028 | 3/1977 | Borsuk | 415/199.5 |
| 4,080,102 | 3/1978 | Schwab | 416/223 A |
| 4,131,387 | 12/1978 | Kazin et al. | 415/181 |
| 4,248,572 | 2/1981 | Fradenburgh | 416/242 |
| 4,251,183 | 2/1981 | Liu et al. | 415/199.2 |
| 4,515,526 | 5/1985 | Levengood | 416/96 R |

FOREIGN PATENT DOCUMENTS 2451453 11/1980 France ........................ 416/223 A

*Primary Examiner*—Donald E. Stout
*Attorney, Agent, or Firm*—James P. Hamley; B. A. Donahue

[57] ABSTRACT

A two-stage turbine includes a first stage comprising a first stator having blades configured for accelerating the drive fluid to supersonic velocities and directing the fluid to the impulse blades of the first rotor. The turbine's second stage includes a second stator having blades configured for directing the fluid from the first stage to the reaction blades of a second rotor at a sonic velocity. Efficient operation of the turbine over a broad range of drive fluid velocities is achieved by providing the stators and rotors with elliptical leading edges to form high angles of attack and providing extended stator tail sections to control fluid flow to the rotors.

5 Claims, 5 Drawing Sheets

TWO-STAGE FLUID DRIVEN TURBINE

BACKGROUND OF THE INVENTION

The present invention is directed to the fluid driven turbine art and, in particular, to a two-stage fluid driven turbine which is capable of high efficiency operation over a broad range of drive fluid velocities.

Numerous turbine configurations are known to the prior art. Turbines are commonly employed to convert a fluid flow to rotation of a drive shaft. A particular application for a turbine is in the testing of fans, pumps or propellers for use in aircraft or other aerospace applications. Ideally, the propeller of fan under test should be driven at speeds normally expected in its intended application. Further, the test structure behind the fan or propeller should be aerodynamically similar to the structure encountered in the actual application, such that flow patterns past the fan or propeller can be simulated. In addition, the drive source to the fan or propeller should be sufficiently quiet such that noise levels produced by the fan or propeller can be accurately measured.

Heretofore, the drives for testing fans and propellers have suffered from numerous deficiencies. For example, hot gas turbine drives have been used in fan and propeller testing, but the size of the hot gas turbines required to drive the fans or propellers to realistic levels has been so large that such turbines have blocked airflow behind the fan or propeller, thereby obstructing airflow measurements. In addition, hot gas turbines are noisy, tending to mask the noise from the fan or propeller under test.

A further problem associated with hot gas turbines is that they are designed to operate within a specific RPM range and do not provide a high output for speeds "off" this range. As such, the use of hot gas turbines has proved inappropriate for testing fans or propellers over their entire operating range.

Additionally, electric motors have been employed in propeller and fan testing. Again, however, the electric motors required to drive fans and propellers to realistic levels have been so large that they, also, block airflow behind the fan or propeller. While attempts have been made in locating the motor in an adjacent room and routing drive shafts with gearing to the propeller, the losses encountered in such constructions have proved intolerable.

The is a long felt need in the propeller and fan testing art, therefore, for a turbine design which exhibits a high output over a broad RPM operating range and which is both quiet and relatively small in configuration.

SUMMARY OF THE INVENTION

The present invention is directed to an improved two-stage fluid driven turbine which produces a high output over a broad RPM range. The turbine exhibits a low noise level and may be housed in a relatively small package.

Briefly, according to the invention, a fluid driven turbine comprises a first stage including a first stator and a first rotor. The first stator includes means for receiving the drive fluid and predeterminedly directing the fluid to the first rotor. The first rotor includes impulse blades for responding to the fluid from the first stator to produce a rotation of the first rotor. The turbine's second stage includes a second stator and a second rotor. The second stator includes means for receiving the drive fluid from the first stage and predeterminedly directing the fluid to the second rotor. The second rotor includes reaction blades for responding to the fluid from the second stator to produce a rotation of the second rotor. The leading edges of the first and second rotors are elliptical in configuration such that the first and second rotor blades present an efficient angle of attack over a broad range of velocities to the fluid drive.

Preferably, the first stator includes a plurality of blades configured to accelerate the drive fluid and direct the drive fluid to the first rotor at a supersonic velocity.

The second stator preferably includes a plurality of blades configured to direct drive fluid to the second rotor at a sonic velocity.

The leading edges of the first and second stators are, also preferably elliptical in configuration to present an efficient angle of attack over a range of velocities of said fluid drive.

It is also preferable to configure the trailling edges of both the rotors and the stators with elliptical contours.

Further, the first and second stators are, preferably, provided with extended tail sections to thereby control the direction of the drive fluid to the first and second rotors, respectively.

DETAILED DESCRIPTION

Figure 1:
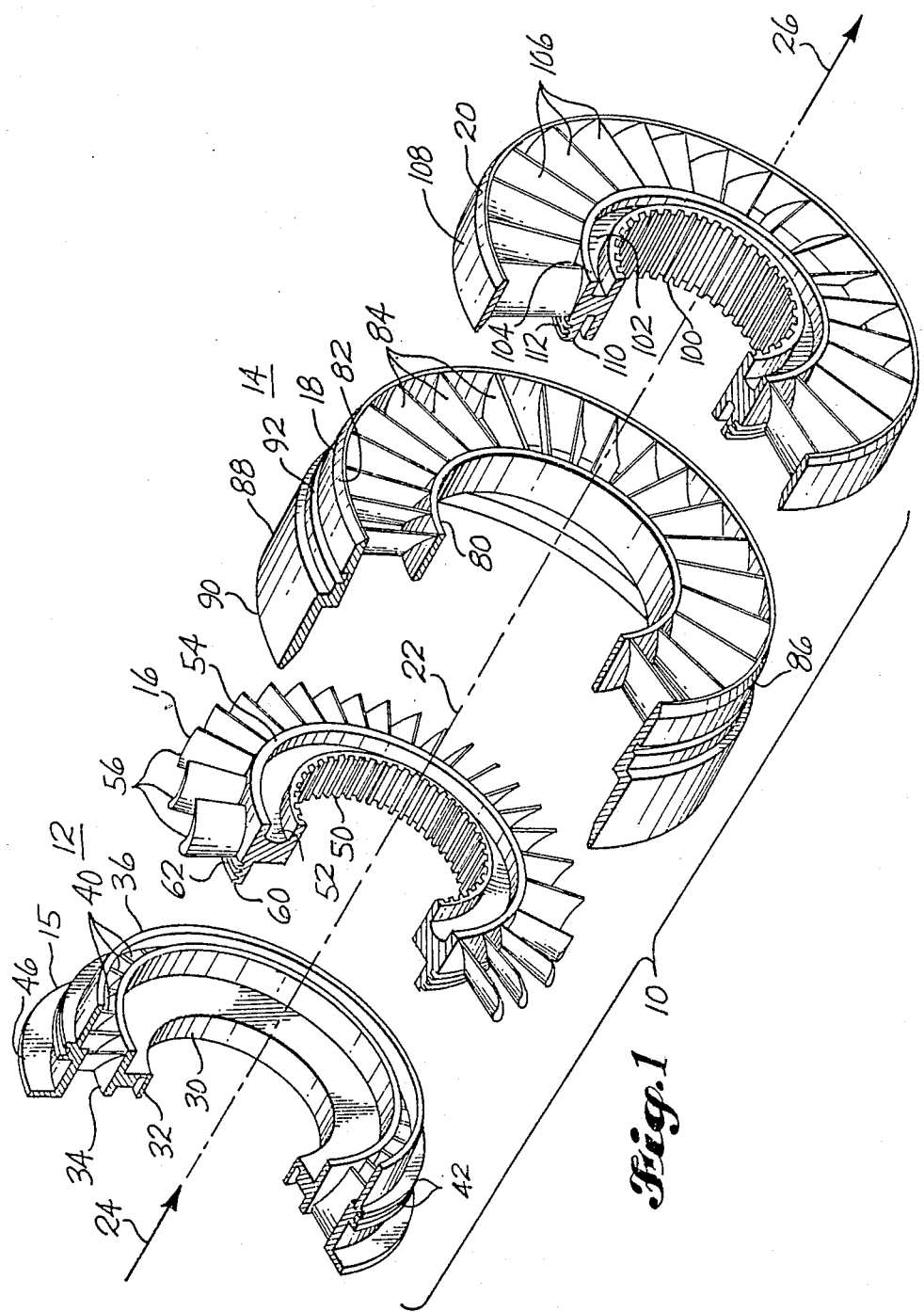
FIG. 1 is an exploded, perspective cutaway view illustrating the rotor and stator configurations of the preferred embodiment of the invention.

FIG. 1 is an exploded, perspective cutaway veiw illustrating the components of the two-stage turbine, indicated generally at 10. These components include a first stage 12, comprised of a first stator 15 and a first rotor 16, and a second stage 14, comprised of a second stator 18 and a second rotor 20. The drive fluid, which, in the case of the preferred embodiment, is cold, compressed air, passed through the longitudinal axis 22 of the turbine, being input to the first stator as indicated by arrow 24 and being passed from the output of the second rotor as indicated by arrow 26.

The first stator 14 is comprised of an inner annular ring 30 having a forward projecting flange 32 on its inside surface and the inner one 34 of concentric rims 34, 36, contiguous to its outer surface. The forward projecting flange 32 is provided to form a sump return path to lubricating oil for bearings (not shown) which support a drive shaft (not shown) in the preferred embodiment.

Situated between the inner and outer rims 34, 36 are a plurality or radial blades 40. As shown more clearly with respect to FIG. 2A, the blade 40 have elliptical forward and trailing edges, and are formed with a radius of curvature to divert the incoming air, as indicated by arrow 24, to a desired angle.

Formed on the outside perimeter of rim 36 are a pair of circumferential support 42 which receive an O-ring seal (not shown). The O-ring seal bears against the underside lip of the second stator (discussed hereinbelow) to prevent the escape of compressed air.

Formed at the forward edge of the outer rim 36 is a annular facing flange 46 which, via a suitable O-ring seal (not shown) forms an airtight seal between the plenum housing (not shown) for the turbine and the first stator 14.

The diverted drive air from the first stator 14 is passed to the first rotor 16. The first rotor 16 has an inner annular hub 50 which is axially splined to mate with corresponding splines on the drive shaft (not shown).

Contiguous with the outer surface of hub 50 is an annular ring 52 which connects at its outside periphery to an annular rim 54. Projecting radially from the outer surface of rim 54 are a plurality of rotor blades 56. As shown more clearly with respect to FIG. 2B, the rotor blades 56 have elliptical forward and trailing edges, and are formed with a curvature and suitable dimensions to comprise blades.

Projecting from the forward surface of rim 54 is an annular flange 60 which has a series of circumferential seal 62 formed on its outside surface. The seal 62 form a sealing surface against the inside surface of the inner rim 34 of the first stator 14 to thereby prevent leakage of the drive air.

The drive air from the first rotor 16 routed to the second stator 18 of the second stage 14. Second stator 18 includes concentric inner and outer annular rims 80, 82, respectively. Situated between the inner and outer rims 80, 82 are a plurality of radially aligned stator blades 84. The stator blades 84, which are shown in greater detail with respect to FIG. 2C, have elliptical leading and trailing edges, and are formed with a curvature designed to direct airflow at a predetermined angle to the second rotor 20. Formed at the trailing edge of the upper surface of the outer rim 82 is a radiused edge 86 designed to form a seal with the outer rim of the second rotor 20, as described below.

An annular flange 88 projects from the forward portion of the outer rim 82 and has a provided under surface for mating with the O-ring (not shown) which rides in the supports 42 on the first stator 14. The forward edge 90 of the flange 88 also forms a sealing contact with the annular facing flange 46 on the first stator 14.

An annular ring 92, having a square cross-section, is provided in the top surface of the outer rim 82 and is designed to support an O-rim (not shown) seal which bears against the plenum supporting structure (not shown).

Drive air from the second stator 18 predeterminedly directed to the second rotor 20. Second rotor 20 includes an inner annular hub 100 which is splined on its inside surface to mate with corresponding splines provided on the drive shaft (not show). Contiguous with the outer surface of hub 100 is ring 102 which is connected at its periphery to an annular, concentric rim 104. Projecting in a radial direction from the outer surface of the rim 104 are a plurality of rotor blades 106. The rotor blades 106, as better shown with respect to FIG. 2D, have elliptical forward and trailing edges, and are dimensioned to form a reaction stage. An outer shroud 108 attaches to the periphery of the blades 106.

The shroud 108 was added in the preferred embodiment of the invention to displace the resonant frequency of the rotor 20 outside of the rotor's active RPM range.

Projecting forward from the rim 104 is an annular flange 110 which has, provided circumferentially on its top surface, a series of seals 112 which are formed to define a seal against the inner surface of the rim 80 of the second stator, thereby preventing leakage of the drive air.

In its preferred construction, the two-stage turbine 10 is 19.3 centimeters (7.6 inches) in diameter and 9.4 centimeter (3.7 inches) long. The stators are preferably formed from braised 17-4 stainless steel whereas the rotor are formed of one-piece 6AL-4V titanium.

Figure 2A:
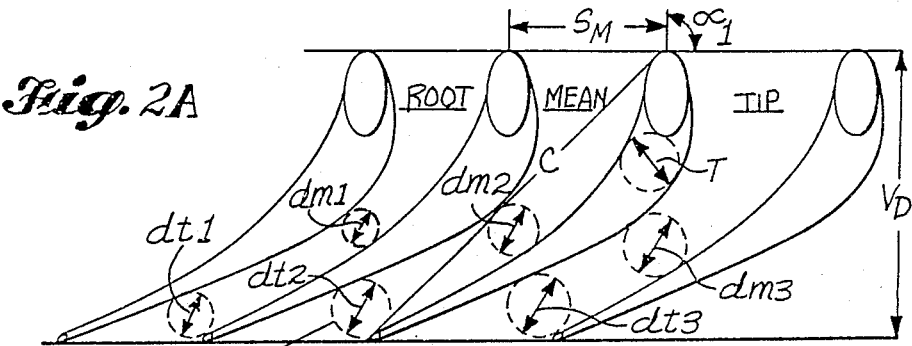
FIGS. 2A–2D are cross-sectional contour drawings illustrating the preferred construction of the stator and rotor blades.
Figure 2B:
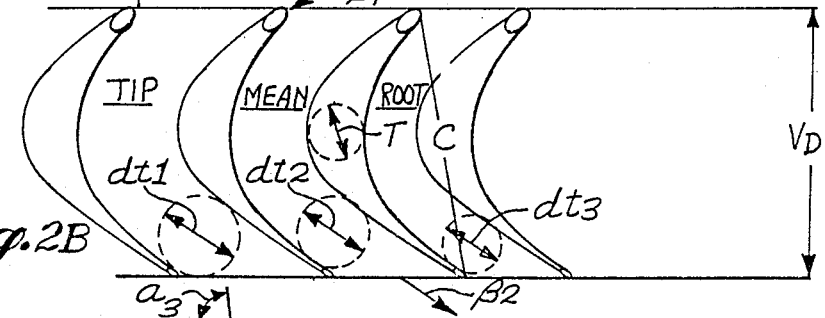
Figure 2C:
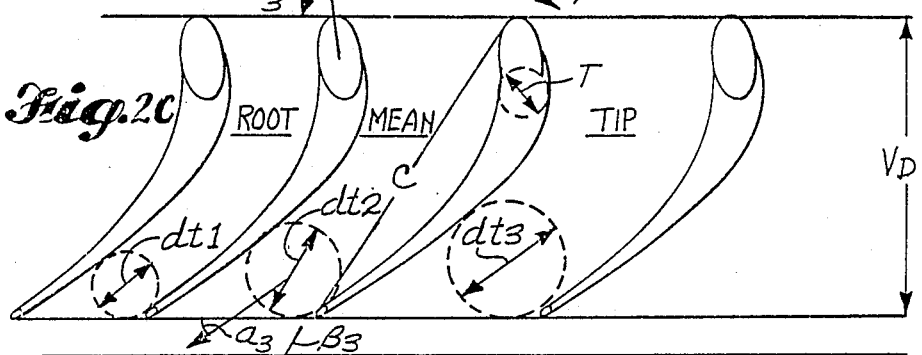
Figure 2D:
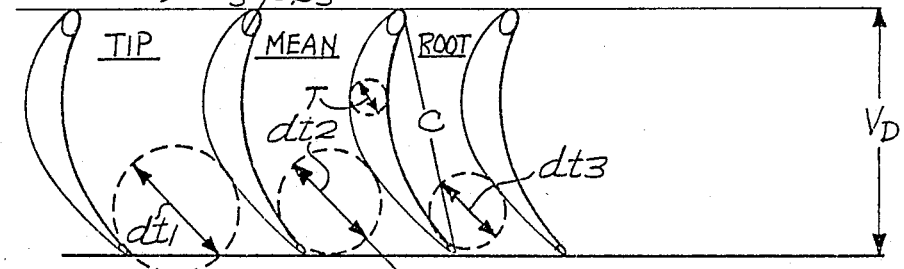

FIG. 2A-D are cross-sectional profiles illustrating the configuration of, and spacing between the rotor and stator blades of the preferred embodiment illustrated in FIG. 1. More specifically, FIG. 2A illustrates the configuration of the first stator blades; FIG. 2B illustrates the configuration of the first rotor blades; FIG. 2C illustrates the configuration of the second stator blades; and, FIG. 2D illustrates the configuration of the second rotor blades. The following sets forth the nomenclature used to define the configuration of the blades:

$\alpha$ = Entrance/exit angle of air into/out of stators
$\beta$ = Entrance/exit angle of air into/out of rotors
C = Length of chord
T = Blade thickness
Z = Number of blades
S = Blade spacing
$T_E$ = Trailing edge thickness
$d_{m1}$ = Distance between the mean points of the blades at the root
$d_{m2}$ = Distance between the means points of the blades at the mean radial diameter
$d_{m3}$ = Distance between the means points of the blades at the tip
$d_{t1}$ = Distance between the trailing edges of the blades at the root
$d_{t2}$ = Distance between the trailing edges of the blades at the means radial
$d_{t3}$ = Distance between the trailing edges of the blades at the tip
$V_D$ = Vertical dimension of the blades The first stator blades, illustrated in FIG. 2A, are defined as follows:
$\alpha_1$ = 90 degrees
$\alpha_2$ = 23 degrees
C = 3.213 centimeters (1.265 inches)
T = 0.508 centimeters (0.200 inches)
T/C = 0.158
Z = 38
$S_M$ = 1.259944 centimeters (0.496041 inches)
$T_E$ = 0.0381 centimeters (0.015 inches)
C/S = 2.55
$d_{m1}$ = 0.307 centimeters (0.121 inches)
$d_{m2}$ = 0.40780 centimeters (0.16055 inches)
$d_{m3}$ = 0.5067 centimeters (0.1995 inches)
$d_{t1}$ = 0.3866 centimeters (0.1522 inches)
$d_{t2}$ = 0.4541 centimeters (0.1788 inches)
$d_{t3}$ = 0.50940 centimeters (0.20055 inches)
$V_D$ = 2.248 centimeters (0.885 inches)

The first rotor blades, with a reference to FIG. 2B, are defines as follows:
$\alpha_1$ = 40 degrees
$\beta_2$ = 36 degrees
C = 2.093 centimeters (0.824 inches)
T = 0.432 centimeters (0.170 inches)

$T/C = 0.206$
$Z = 47$
$S_M = 1.019912$ centimeters (0.401054 inches)
$T_E = 0.038$ centimeters (0.015 inches)
$C/S = 2.05$
$d_{t1} = 0.6645$ centimeters (0.2616 inches)
$d_{t2} = 0.5606$ centimeters (0.2207 inches)
$d_{t3} = 0.4562$ centimeters (0.1796 inches)
$V_D = 2.083$ centimeters (0.820 inches The second stator blades with reference to FIG. 2C, are defined as follows:
$\alpha_2 = 82$ degrees
$\alpha_3 = 35$ degrees
$C = 2.74066$ centimeters (1.079 inches)
$T = 0.394$ centimeters (0.155 inches)
$T/C = 0.143$
$Z = 31$
$S_M = 2.740660$ centimeters (0.538559 inches)
$T_E = 0.038$ centimeters (0.015 inches)
$C/S = 2.00$
$d_{t1} = 0.5692$ centimeters (0.2241 inches)
$d_{t2} = 0.932$ centimeters (0.367 inches)
$d_{t3} = 0.9462$ centimeters (0.3725 inches)
$V_D = 2.34315$ centimeters (0.9225 inches)

The second rotor blades, with reference to FIG. 2D, are defined as follows:
$\beta_3 = 69$ degrees
$\beta_4 = 45$ degrees
$C = 1.986$ centimeters (0.782 inches)
$T = 0.2858$ centimeters (0.1125 inches)
$Z = 43$
$S_M = 1.11343$ centimeters (0.43836 inches)
$T_E 0.038$ centimeters (0.15 inches)
$C/S = 1.78$
$d_{t1} = 0.9939$ centimeters (0.3909 inches)
$d_{t2} = 0.7894$ centimeters (0.3108 inches)
$d_{t3} = 0.5857$ centimeters (0.2306 inches)
$V_D = 1.9368$ centimeters (0.7625 inches)

Typical spacing between the rotor and stator blades is 0.254 centimeter (0.10 inches).

The entire two-stage turbine package, as defined with respect to FIG. 2A-D, is 19.3 centimeters (7.6 inches) in diameter and 9.4 centimeters (3.7 inches) long. The efficiency of this turbine as tested was 83% compared to the 75.6% calculated from the means velocity diagrams of FIG. 3. This accomplished by designing the first stator blades (FIG. 2A) to provide supersonic exit velocities for the drive air which then impinges upon the highly loaded first rotor impulse blades. Approximately two-thirds of the power developed by the two-stage turbine is produced in this first stage. The second stage stator blades (FIG. 2C) produce sonic exit velocities for the drive air which then impinges upon the second rotor (FIG. 2D) high reaction blades which act to extract the maximum amount of available energy from the drive air.

The defined blading for the two-stage turbine automatically adjusts the power split between the two stages to give high efficiency from low to maximum power.

Another important feature of this design is that the second stage acts to buffer the first stage from exhaust disturbances. Disturbances in the fluid flow out of the turbine, if not suitably in the second stage, might produce a choking type shock wave in the first stage, thereby significantly reducing first stage efficiency.

A further particular feature of the invention is that as is illustrated in FIGS 2A-D, both the leading and trailing edges of each of the rotor and stator blades are elliptical in configuration. As such, each blade exhibits an efficient angle of attack to the impinging drive fluid over a broad range of drive fluid velocities. The present design is, therefore, more suitable for applications requiring a broad RPM range (such as the testing of propellers and fans for us in aircraft propulsion) than are numerous turbines known to the prior art which exhibit acceptable efficiency over only a narrow RPM range.

In addition, it should be noted that the tail sections of the stators are significantly extended to thereby precisely control the direction of drive airflow to the rotors, assuring high conversion efficiency.

Figure 3:
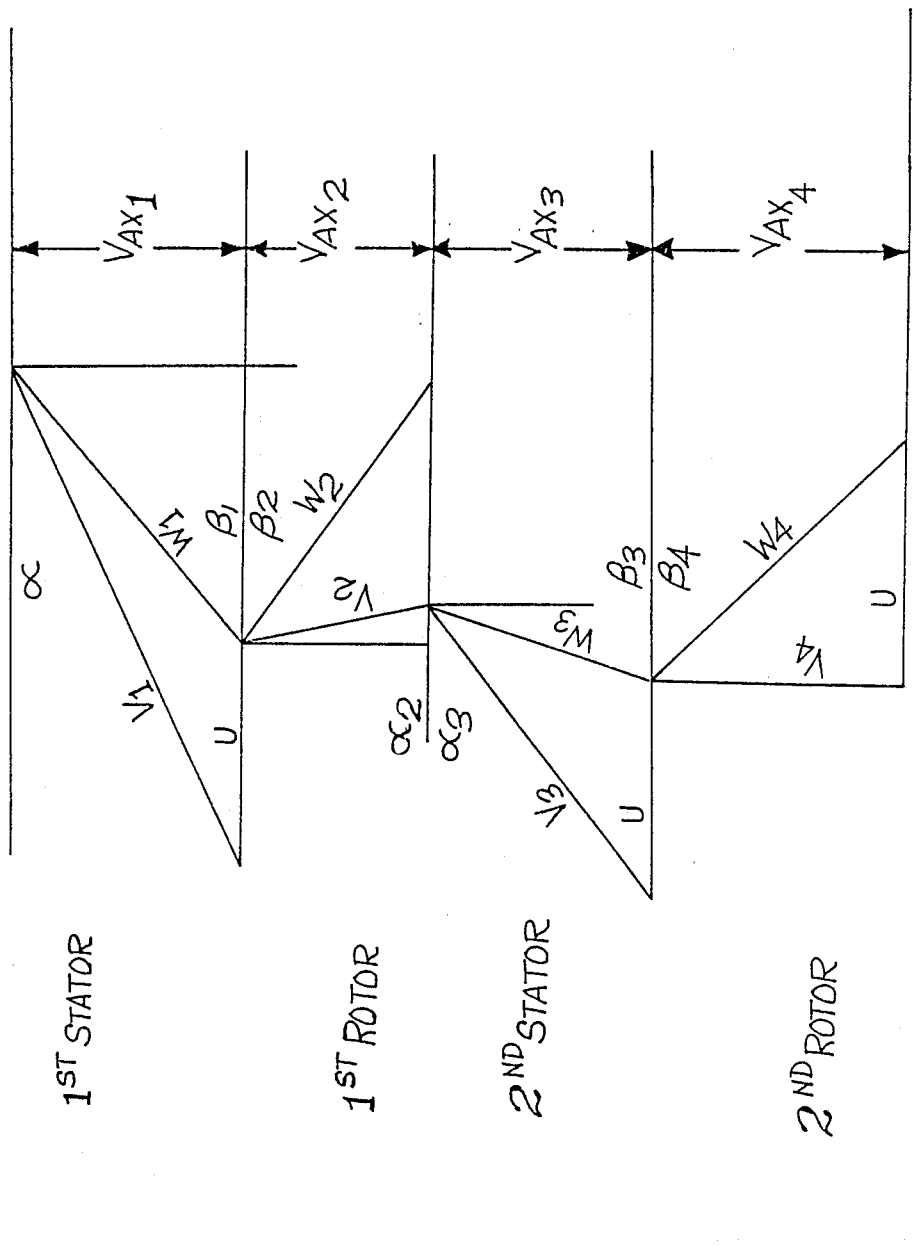
FIG. 3 is a velocity diagram illustrating fluid flow through the preferred embodiment of the two-stage turbine.

FIG. 3 is a vector diagram which illustrates velocities of the drive air and the rotors throughout the two-stage turbine at the mean blade position. The various entrance and exit angles A and B are those as defined above with respect to FIG. 2A-D. In FIG. 3, the following definitions for the variables apply:

V = Actual drive fluid velocity
W = Relative velocity of gas with respect to the rotor
U = Peripheral velocity of the rotor
$V_{AX}$ = The axial component of the drive gas velocity With respect to the first stator portion:
$V_1 = 1406.97$ feet/second
$W_1 = 921.10$ feet/second
$U = 565.94$ feet/second
$V_{AX1} = 578.98$ feet/second For the first rotor:
$V_2 = 478.95$ feet/second
$W_2 = 802.44$ feet/second
$U = 565.94$
$V_{AX2} = 471.66$ feet/second For the second stator:
$V_3 = 946.64$ feet/second
$W_3 = 584.25$ feet/second
$U = 565.94$ feet/second
$V_{AX3} = 546.29$ feet/second For the second rootor:
$V_4 = 663.267$ feet/second
$W_4 = 891.57$ feet/second
$U = 565.97$ feet/second
$V_{AX4} = 662.57$ feet/second FIG. 4, 5A and 5B are graphs illustrating the performance capabilities of the preferred embodiment of the two-stage tubine.

Figure 4:
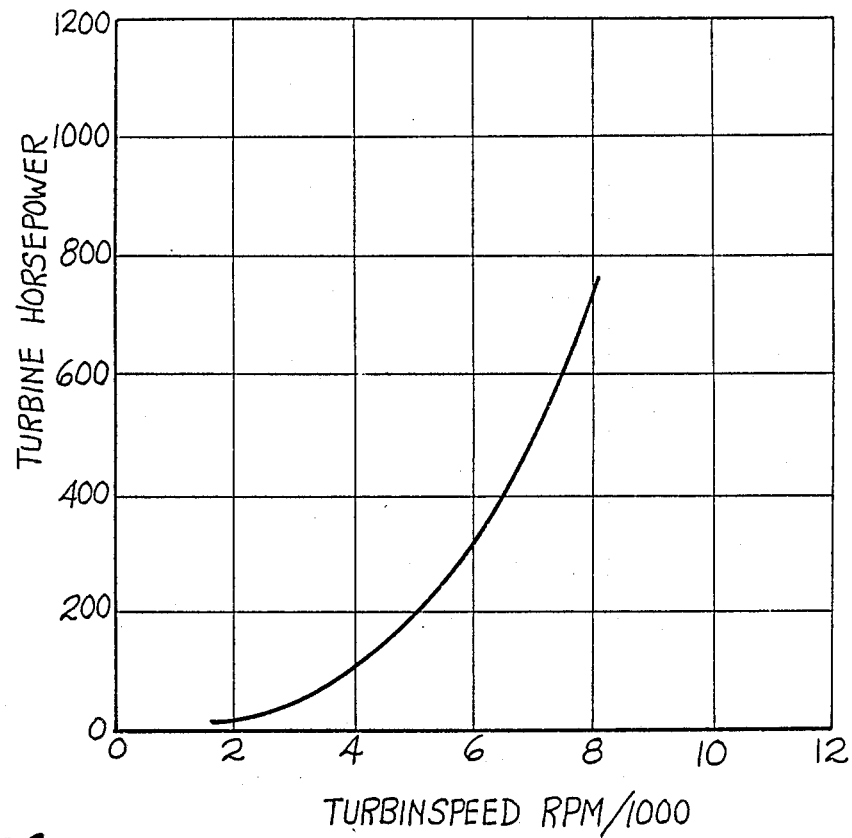
FIG. 4 is graph illustrating the horsepower output vs. RPM for the preferred two-stage turbine design.

Referring to FIG. 4, plotted is turbine horsepower vs. turbine RPM.

Figure 5A:
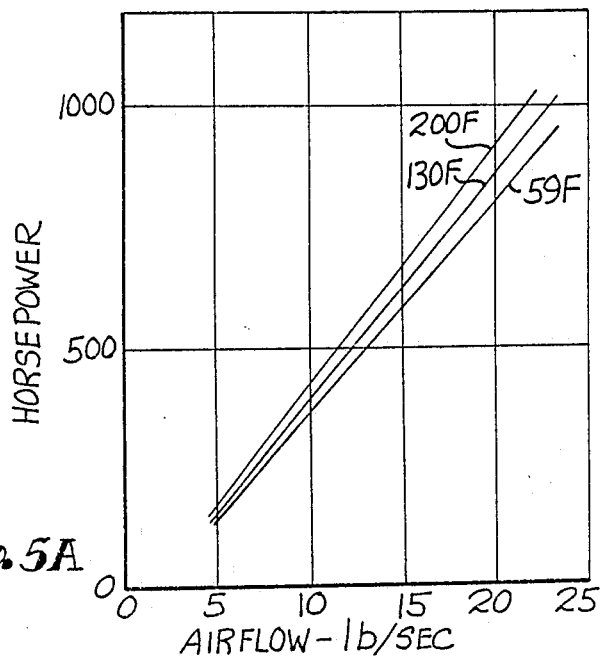
FIG. 5A and 5B are graphs illustrating horsepower and inlet pressure, respectively, vs. airflow for the preferred embodiment of the two-stage turbine.
Figure 5B:
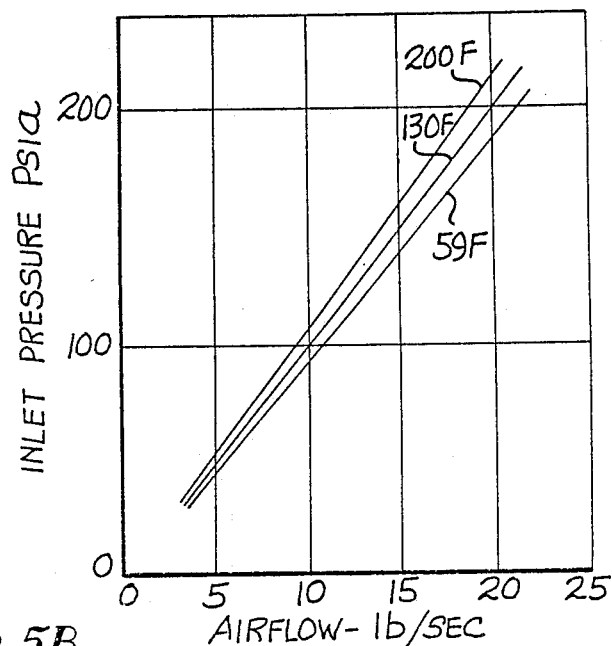

FIGS. 5A and 5B plot horsepower and inlet pressure, respectively, vs. the flow of the drive air for the indicated drive air temperatures.

It will be observed that the two-stage configuration of the present invention exhibits a high output over a broad operating range.

The incorporation of elliptically shaped leading and trailing edges, combined with extending the pressure and suction surfaces at the trailing edges of impulse and reaction turbine blanding, indicates that the increased instance angle tolerance is achieved with minimized exit flow angle deviation for transonic and subsonic turbine stages using untwisted blades operating with a hub-to-tip ratio of 0.69 to 0.59.

In addition to the above, interstage losses by the stators and rotors and carry-losses by the impulse and reaction stages are optimized by untwisted blades, which allow minimizing the number of blades, and reducing axial clearances and bearing loads for cantilevered turbines.

A particular feature of the invention is the off-design point performance; e.g., obtaining high power at low turbine speed. This is done by providing an expansion area at the transonic nozzle exit that gives an increase in "spouting" velocity from the nozzle that increases first stage turbine torque to partially compensate for the higher loss percentage of total power at low RPM.

In summary, an improved two-stage fluid drive turbine design has been described in detail. The described turbine exhibits a high efficiency over a broad range of RPM. Further, it is relatively compact in size such that it may be adapted for applications requiring a small package configuration, such as in the testing of aircraft fans and propellers. In addition, the described turbine design does not require the use of twisted blades, thereby realizing a significant reduction in the cost of manufacture.

Whereas the preferred embodiment of the invention has been described in detail, it should be apparent that many modifications and variations thereto are possible, all of which fall within the true spirit and scope of the invention.

We claim:

1. A fluid driven turbine comprising:
a first stage including a first stator and a first rotor, said first stator including a plurality of blades predeterminedly configured to accelerate said drive fluid and direct said drive fluid to said first rotor at a supersonic velocity, said first rotor including impulse blades for responding to said fluid drive from said first stator to produce a rotation of said first rotor, the leading edges of said first stator and first blades having predetermined elliptical sections oriented to form a predetermined angle of attack for providing high efficiency operation over a broad range of turbine operating velocities; and a second stage including a second stator and a second rotor, said second stator including a plurality of blades configured to receive drive fluid from said first stage and direct said drive fluid to said second rotor at sonic velocity, said second rotor including a plurality of reaction blades for responding to said drive fluid from said second stator to produce rotation of said second rotor, the leading edges of said second stator and second rotor blades having predetermined elliptical sections oriented to form a predetermined angle of attack for providing high efficiency operation over a broad range of turbine operating velocities and the trailing edges of said first and second rotors being elliptical in configuration.

2. The turbine of claim 1 wherein:
said first and second stators are provided with extended tail section to thereby control the direction of said drive fluid to said first and second rotors, respectively.

3. The turbine of claim 2 wherein:
the blades of said first stator are configured to form an entrance angle of approximately 90° and an exit angle of approximately 23°; and
the blades of said first rotor are configured to form an entrance angle of approximately 40° and an exit angle of approximately 36°.

4. The turbine of claim 3 wherein: the blades of said second stator are configured to form an entrance angle of approximately 82° and an exit angle of approximately 35°; and
the blades of said second rotor are configured to form an entrance angle of approximately 69° and an exit angle of approximately 46°.

5. The turbine of claim 1 wherein the trailing edges of said first and second stators are elliptical in configuration.

UNITED STATES PATENT AND TRADEMARK OFFICE
CERTIFICATE OF CORRECTION

PATENT NO. : 4,968,216

DATED : November 6, 1990

INVENTOR(S) : Anderson, et al.

Page 1 Of 2

It is certified that error appears in the above—identified patent and that said Letters Patent is hereby corrected as shown below:

```
Column 1, line 14 delete "of" and insert --or--.
Column 1, line 49 delete "The" and insert --There--.
Column 2, line 18 insert --,-- following "also".
Column 2, line 41 delete "FIG." and insert --FIGS.--.
Column 2, line 53 insert --is-- following "air,".
Column 2, line 66 delete "or" and insert --of--.
Column 2, line 67 delete "blade" and insert --blades--.
Column 3, line 4 delete "support" and insert --supports--.
Column 3, line 8 delete "a" and insert --an--.
Column 3, line 25 add --impulse-- following "comprise".
Column 3, line 28 delete first "seal" and insert --seals--.
Column 3, line 28 delete second "seal" and insert --seals--.
Column 3, line 32 add --is-- following "16".
Column 3, line 53 delete "O-rim" and insert --O-ring--.
Column 3, line 56 add --is-- following "18".
Column 3, line 61 add --a-- following "100 is".
Column 4, line 11-12 delete "centimeter" and insert --centimeters--
Column 4, line 14 delete "rotor" and insert --rotors--.
Column 4, line 15 delete "FIG." and insert --FIGS.--.
Column 4, line 34 delete "means" and insert --mean--.
Column 4, line 36 delete "means" and insert --mean--.
Column 4, line 41 delete "means" and insert --mean--.
Column 4, line 64 delete "defines" and insert --defined--.
Column 4, line 65 delete "$\alpha_1$" and insert --$\beta_1$--.
Column 5, line 9 add --)-- following "inches".
Column 5, line 33 delete "$T_E0.038$" and insert --$T_E = 0.038$--.
Column 5, line 33 delete "0.15" and insert --0.015--.
Column 5, line 40 delete "centimeter" and insert --centimeters--.
Column 5, line 45 delete "means" and insert --mean--.
Column 5, line 46 add --is-- following "This".
Column 5, line 54 delete space before "(FIG. 2D)".
Column 5, line 63 add --buffered-- following "suitably".
Column 5, line 67 delete "FIGS" and insert "FIGS.".
```

UNITED STATES PATENT AND TRADEMARK OFFICE
CERTIFICATE OF CORRECTION

PATENT NO.  : 4,968,216
DATED       : November 6, 1990
INVENTOR(S) : Anderson, et al.

It is certified that error appears in the above—identified patent and that said Letters Patent is hereby corrected as shown below:

Column 6, line 6 delete "us" and insert --use--.
Column 6, line 16 delete "A" and insert --$\alpha$--.
Column 6, line 16 delete "B" and insert --$\beta$--.
Column 6, line 39 delete "rooter" and insert --rotor--.
Column 6, line 42 delete "565.97" and insert --565.94--.
Column 6, line 44 delete "FIG." and insert --FIGS.--.
Column 6, line 46 delete "tubine" and insert --turbine--.
Column 6, line 53 delete "invention" and insert --design--.
Column 6, line 58 delete "blanding" and insert --blading--.
Column 6, line 64 delete "carry-losses" and insert --carry-over losses--.
Column 6, line 66 delete "allow" and insert --allows--.
Column 7, line 35 add --rotor-- following "first".
Column 8, line 18 delete "section" and insert --sections--.

Signed and Sealed this

Ninth Day of June, 1992

Attest:

DOUGLAS B. COMER

*Attesting Officer*    Acting Commissioner of Patents and Trademarks